United States Patent
Idzik et al.

(10) Patent No.: US 8,957,878 B2
(45) Date of Patent: *Feb. 17, 2015

(54) APPARATUS AND METHOD FOR SELECTING STYLUS LOCATION-DETERMINATION INFORMATION PROVIDED BY A PLURALITY OF NON-PASSIVE STYLUS-LOCATION MODALITIES

(71) Applicant: Research In Motion Limited, Waterloo (CA)

(72) Inventors: Jacek S. Idzik, Kenilworth (CA); Rohan Michael Nandakumar, Kitchener (CA); Cornel Mercea, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/803,384

(22) Filed: Mar. 14, 2013

(65) Prior Publication Data

US 2014/0035885 A1 Feb. 6, 2014

Related U.S. Application Data

(63) Continuation-in-part of application No. 13/562,918, filed on Jul. 31, 2012.

(51) Int. Cl.
*G06F 3/033* (2013.01)
*G06F 3/01* (2006.01)
(Continued)

(52) U.S. Cl.
CPC ...... *G06F 3/01* (2013.01); *G06F 3/046* (2013.01); *G06F 3/03545* (2013.01)
USPC ........................................ 345/179; 178/18.03

(58) Field of Classification Search
CPC ..... G06F 3/0345; G06F 3/0383; G06F 3/033; G06F 3/0354; G06F 3/03542; G06F 3/03545; G06F 3/03546; G06F 3/038; G06F 3/0386; G06F 3/0317; G06F 2203/0381; G06F 2203/0384
USPC ............................. 345/179; 178/19.01–19.06
See application file for complete search history.

(56) References Cited

U.S. PATENT DOCUMENTS 6,492,979 B1  12/2002  Kent et al.
7,499,035 B2  3/2009  Kolmykov-Zotov et al.
(Continued)

FOREIGN PATENT DOCUMENTS

WO   2006/133018 A1   12/2006
WO   2011154950 A1    12/2011

OTHER PUBLICATIONS

Extended European Search Report from related European Patent Application No. 13159142.2 dated Nov. 12, 2013; 9 pages.
(Continued)

*Primary Examiner* — Stephen Sherman
(74) *Attorney, Agent, or Firm* — Fitch, Even, Tabin & Flannery LLP

(57) ABSTRACT

A stylus includes a stylus housing that supports a control circuit. The control circuit is configured automatically compare data quality as corresponds to stylus location-determination information being provided by at least two different stylus-based candidate non-passive location modalities to thereby select a particular stylus-based non-passive location modality and to then use that particular stylus-based non-passive location modality when transmitting stylus location-determination information to a corresponding electronic device.

14 Claims, 4 Drawing Sheets

(51) Int. Cl.
*G06F 3/046* (2006.01)
*G06F 3/0354* (2013.01)

(56) References Cited

U.S. PATENT DOCUMENTS

| | | |
|---|---|---|
| 7,646,379 B1 | 1/2010 | Drennan et al. |
| 7,719,515 B2 | 5/2010 | Fujiwara et al. |
| 7,999,794 B2 | 8/2011 | Janik |
| 2002/0040817 A1* | 4/2002 | LeKuch et al. ............ 178/18.09 |
| 2005/0110777 A1 | 5/2005 | Geaghan et al. |
| 2006/0227121 A1 | 10/2006 | Oliver |
| 2009/0139778 A1 | 6/2009 | Butler et al. |
| 2010/0220078 A1 | 9/2010 | Zloter et al. |
| 2012/0062520 A1 | 3/2012 | Knee |
| 2012/0062521 A1 | 3/2012 | Ahn et al. |
| 2012/0086661 A1 | 4/2012 | Shi et al. |

OTHER PUBLICATIONS

Extended European Search Report from related European Patent Application No. 12178635.4 dated Nov. 9, 2012; 7 pages.

* cited by examiner

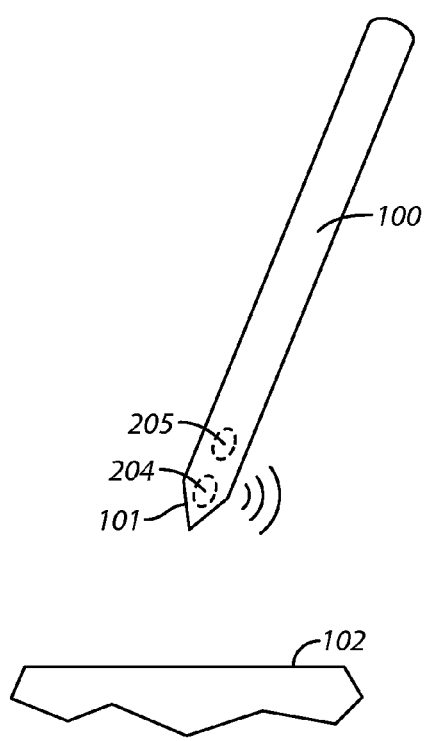
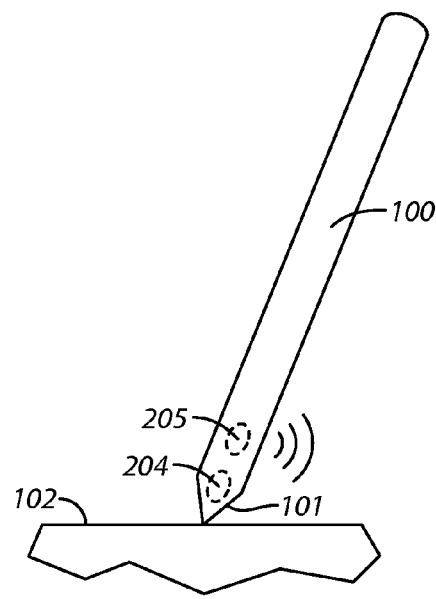
FIG. 3  FIG. 4

APPARATUS AND METHOD FOR SELECTING STYLUS LOCATION-DETERMINATION INFORMATION PROVIDED BY A PLURALITY OF NON-PASSIVE STYLUS-LOCATION MODALITIES

RELATED APPLICATIONS

This application is a continuation-in-part application of co-pending and co-owned U.S. patent application Ser. No. 13/562,918, entitled METHOD PERTAINING TO A STYLUS HAVING A PLURALITY OF NONPASSIVE LOCATION MODALITIES and filed Jul. 31, 2012, which is incorporated by reference in its entirety herein

FIELD OF TECHNOLOGY

The present disclosure relates to non-passive styli and to surfaces configured to receive input via a non-passive stylus.

BACKGROUND

Many electronic devices, including portable electronic devices such as but not limited to so-called smartphones and tablet/pad-styled devices, are configured to receive user input, at least in part, via a surface such as a display. A touch-sensitive display, for example, provides a way for a user to tap or swipe the display surface with a finger in order to express selections, input information, and so forth.

Many devices are configured to work specifically with a hand-held stylus in these same regards (either in lieu of the foregoing or in combination therewith). Some displays, for example, include a plurality of light-emitting transmitter/receiver pairs disposed along the sides of the display. By determining where a stylus breaks one of the corresponding light beams the device can determine a present location of the stylus and utilize that location information accordingly. Such an approach represents a passive location modality in that the behavior of the stylus as regards imparting location-determination information or otherwise participating in the location-determining process is passive.

In some instances the stylus comprises a non-passive stylus. In some cases this means the stylus includes one or more electrically-powered components that serve to interact with the display in a way that facilitates the display determining, for example, a point of contact between the stylus and the display. In general, a non-passive location modality pertains to stylus behavior that is other than a merely passive presence.

There are, in fact, a considerable number of non-passive location modalities presently known with more likely to become available. At least one reason for the considerable number of approaches in these regards is that no one approach is superior to all other approaches for all possible interactions. In particular, not only can the quality of data being provided by each of a plurality of available location modalities differ from one another, the standard for what constitutes "quality" can also vary as a function, for example, of the active application presently being used by the electronic device.

BRIEF DESCRIPTION OF THE DRAWINGS

FIG. 3 is a side-elevational schematic view in accordance with the disclosure.

FIG. 4 is a side-elevational schematic view in accordance with the disclosure.

DETAILED DESCRIPTION

Figure 1:
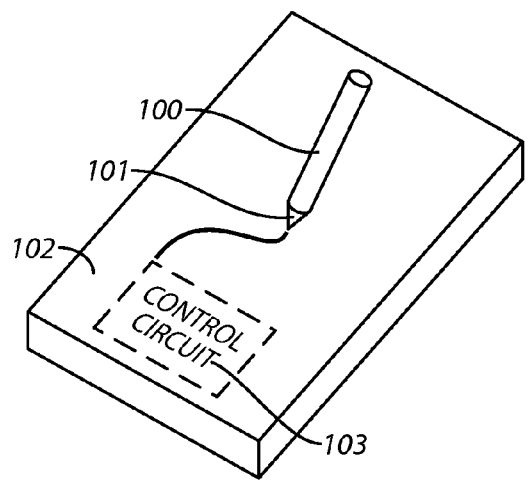
FIG. 1 is a perspective schematic view in accordance with the disclosure.

The following describes an apparatus and method pertaining to a stylus configured for interactive use with a surface such as but not limited to a display. The stylus includes a stylus housing that supports a control circuit. The control circuit is configured automatically compare data quality as corresponds to stylus location-determination information being provided by at least two different stylus-based candidate non-passive location modalities to thereby select a particular stylus-based non-passive location modality and to then use that particular stylus-based non-passive location modality when transmitting stylus location-determination information to an electronic device that comprises the aforementioned surface.

As used herein, the expression "location modality" will be understood to refer to a particular technology and approach to determining the location of a stylus with respect to a corresponding surface. Accordingly, different location modalities will be understood to refer to different ways of determining the location of the stylus rather than, for example, merely different ways of communicating the same location-determining information. Accordingly, the foregoing non-passive location modalities differ from one another in kind and not merely by degree. By way of illustration and without intending any limitations in these regards, a first non-passive location modality can comprise, say, a capacitively-based non-passive location modality while a second non-passive location modality can comprise an acoustically-based non-passive location modality.

Accordingly, one of the non-passive location modalities can perform better under some operating circumstances while another of the non-passive location modalities performs better under other operating circumstances. Similarly, one location modality may provide a better quality of data (for example, higher-resolution data) than another location modality. These teachings provide for selecting from amongst the candidate available non-passive location modalities to permit using a best approach at a given time These teachings are highly flexible in practice, however, and will accommodate a wide range of notions as regards what comprises a useful measure of quality in a given setting. By one approach, for example, the stylus control circuit can dynamically employ, at any given time, one of a plurality of available data quality standards as a function of, say, an application that is currently active in the corresponding electronic device with which the stylus is used.

These teachings are also highly scalable and can be readily employed in conjunction with a variety of differently-sized and differently-purposed styli, surfaces, and non-passive location modalities.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a stylus 100. Generally speaking, a stylus is typically a hand-held utensil that often (but not exclusively) has a pencil-like elongated form factor and that includes at least one pointed end (i.e., a writing tip 101) configured to interact with a corresponding surface 102. Using a stylus as an input mechanism with a display offers a variety of advantages over a fingertip including the opportunity for increased precision as well as an expression modality that accords with the user's own past experience with a pencil or pen.

The surface 102 can vary from one application setting to another. For the sake of illustration but without intending any limitations in these regards, it will be presumed here that the surface 102 comprises a display. In this case, then, interactions between the stylus 100 and the surface 102 can result, for example, in a selection of particular displayed actions, in the presentation of an electronic ink line, and so forth as desired and depending, for example, upon which application might presently be active in the device that comprises the surface 102.

These various ways in which a stylus's interaction with a surface can be leveraged and utilized comprises a well-understood area of prior art endeavor. As the present teachings are not particularly sensitive to any particular selections in these regards, further elaboration here will not be presented for the sake of brevity.

Generally speaking, in a typical application setting, the surface 102 will include a control circuit 103 that works in cooperation with one or more location-determination systems/components (not shown) to determine a present location (and/or orientation) of the stylus 100. These location-determination systems/components can include a variety of transmitters and/or receivers for a variety of different kinds of energy. Again, the present teachings are not particularly sensitive to any particular choices in these regards save to ensure that the various location-determination modalities used for the stylus 100 are matched by the location-determining modalities of the surface 102. So configured, the control circuit 103 is configured to use location information from these location-determining modalities to determine a relative position of at least a portion of the stylus 100 with respect to the surface 102.

It may also be noted here that the need for quality location information can vary depending upon the needs of a given active application. For example, extremely accurate location information may not be required when the application presents checkboxes for the user to tap with the stylus. On the other hand, higher-resolution location information can be important when the application comprises, say, a drawing program by which the user employs the stylus to add small, nuanced details to an artistic rendering of some image of choice.

Figure 2:
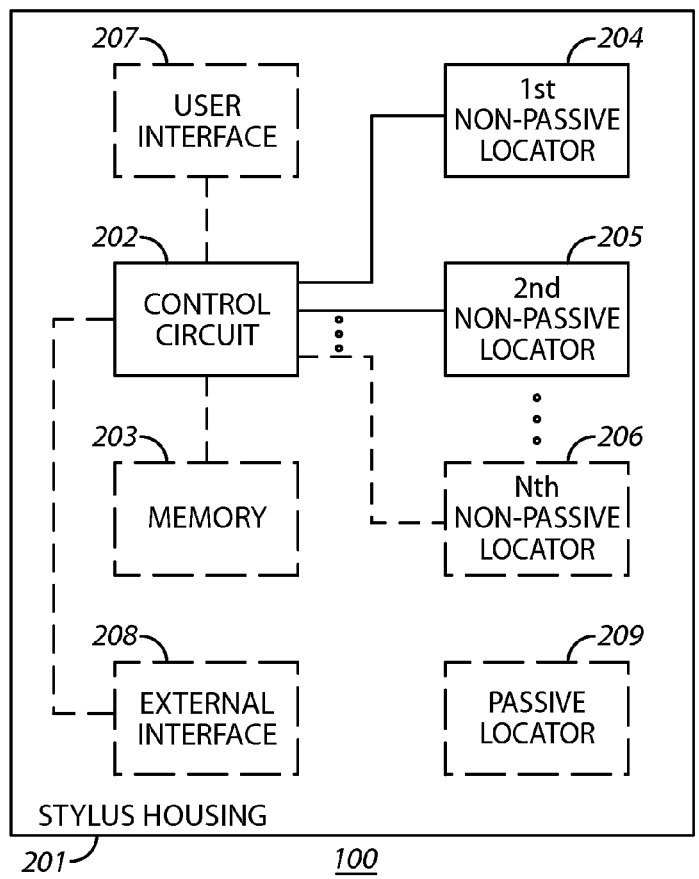
FIG. 2 is a block diagram in accordance with the disclosure.

FIG. 2 presents an illustrative depiction of the stylus 100. The stylus 100 includes a stylus housing 201. The stylus housing 201 will typically have a form factor suitable to accommodate hand-held use and manipulation per the intended and expected use and functionality of the tool. That said, this housing 201 can vary to some extent in size and shape and can be comprised of any of a variety of materials as best suit a given application setting (and, in some cases, a selection of particular non-passive location modalities to support).

The stylus housing 201 supports a number of components. These components may, in some cases, be integrated into a singular "component" or may comprise a plurality of physically discrete elements as desired.

A control circuit 202 can comprise a fixed-purpose hard-wired platform or can comprise a partially or wholly programmable platform. These architectural options are well known and understood in the art and require no further description here.

By one approach this control circuit 202 can include (or can otherwise be coupled to) a memory 203. This memory 203 can serve, for example, to non-transitorily store the computer instructions that, when executed by the control circuit 202, cause the control circuit 202 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This control circuit 202 is configured to selectively effect at least two different non-passive location modalities where each of the non-passive location modalities imparts location-determination information to the aforementioned surface 102 (and in particular to the aforementioned surface control circuit 103). To support this capability the control circuit 202 operably couples to both a first and a second non-passive locator 204 and 205. (These teachings will in fact accommodate a greater number of non-passive locators as illustrated by optional inclusion of an Nth non-passive locator 206, where "N" is any integer greater than 3.)

These non-passive locators are different from one another as noted above.

Generally speaking, these teachings will support any of a wide variety of possibilities in these regards. Supported non-passive location modalities (and their corresponding non-passive locators) include, but are certainly not limited to:

a capacitively-based non-passive location modality;
an acoustically-based non-passive location modality;
a magnetically-based non-passive location modality;
a light-emitting-based non-passive location modality; and
a radio-frequency-based non-passive location modality.

Specific examples in all of these regards abound in the prior art. The so-called EPOS™ system, for example, is an acoustically-based non-passive location modality while the N-Trig™ approach is an example of a capacitively-based non-passive location modality.

In a typical application setting the various available non-passive location modalities will differ from one another at least to some extent with respect to their corresponding data quality. For example, a first available non-passive location modality (such as an acoustically-based non-passive location modality) may provide better quality data when the stylus 100 hovers over the surface 102 as compared to when the stylus 100 contacts the surface 102 while a second available non-passive location modality (such as a capacitively-based non-passive location modality) may provide better quality data when the stylus 100 contacts the surface 102 as compared to when the stylus 100 hovers over the surface 102.

Figure 5:
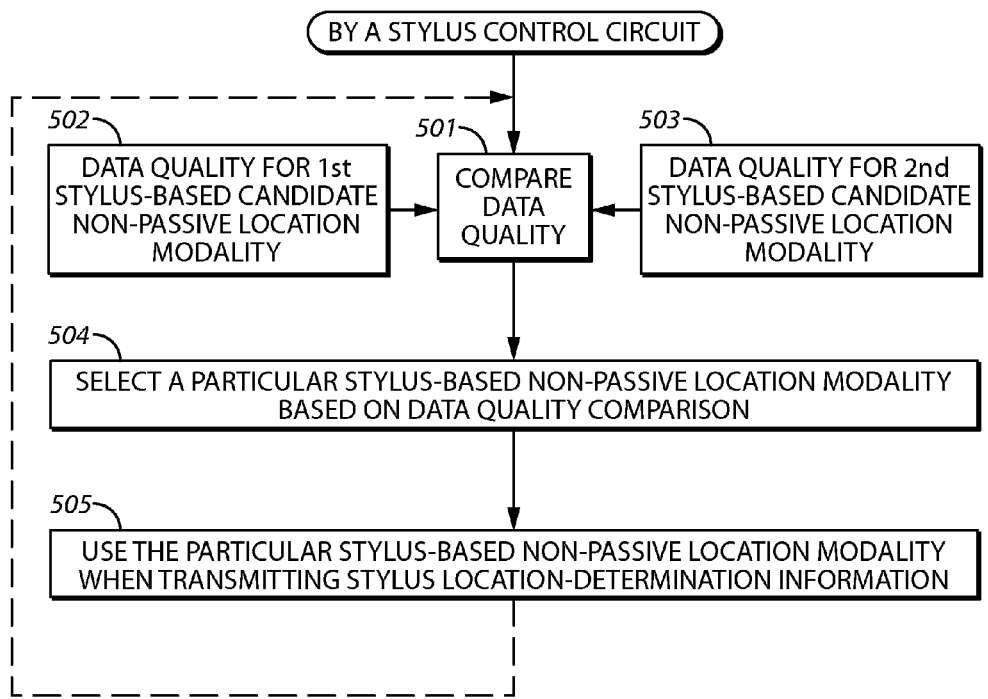
FIG. 5 is a flow diagram in accordance with the disclosure.

Armed with these capabilities the control circuit 202 can then select whether to transmit the location-determination information from a first one of the non-passive location modalities or to transmit the location-determination information from a second, different one of the non-passive location modalities. Referring to FIG. 5, at 501 such a selection can be based, for example, upon a comparison of data quality as corresponds to a first stylus-based candidate non-passive location modality 502 and data quality as corresponds to a second, different stylus-based candidate non-passive location modality 503. (If desired, these teachings will readily accommodate also comparing data quality for such information as provided by any number of other additional (and different) non-passive location modalities.)

At 504 the control circuit 202 then selects a particular stylus-based non-passive location modality based on that data quality comparison and uses (at 505) that particular stylus-based non-passive location modality when transmitting stylus location-determination information to the control circuit 103 of the corresponding surface 102.

By one approach the aforementioned data quality can comprise one or more metrics that correspond or even directly represent the relative presence or absence of valid data (i.e., data have an inherently correct form and nature). (Detecting the presence or absence of "valid" data in other contexts comprises a well-understood area of prior-art endeavor and accordingly no further elaboration will be provided here in those regards.)

This process 500 can be repeated on as frequent a basis as may be desired. By one approach, for example, the control circuit 202 repeats this process 500 at least one every fifty milliseconds. For many application settings a periodicity of about one hundred milliseconds may provide at least adequate performance.

FIG. 3 depicts an illustrative example in these regards where the control circuit 202 has selected the first non-passive locator 204 as corresponds to the first non-passive location modality for providing higher-quality data as compared to the second non-passive locator 205. In FIG. 4, however, circumstances have changed and it is the second non-passive locator 205 that now provides the higher-quality data. Accordingly, the control circuit 202 switches to using the second non-passive locator 205 and the corresponding second non-passive location modality.

Figure 6:
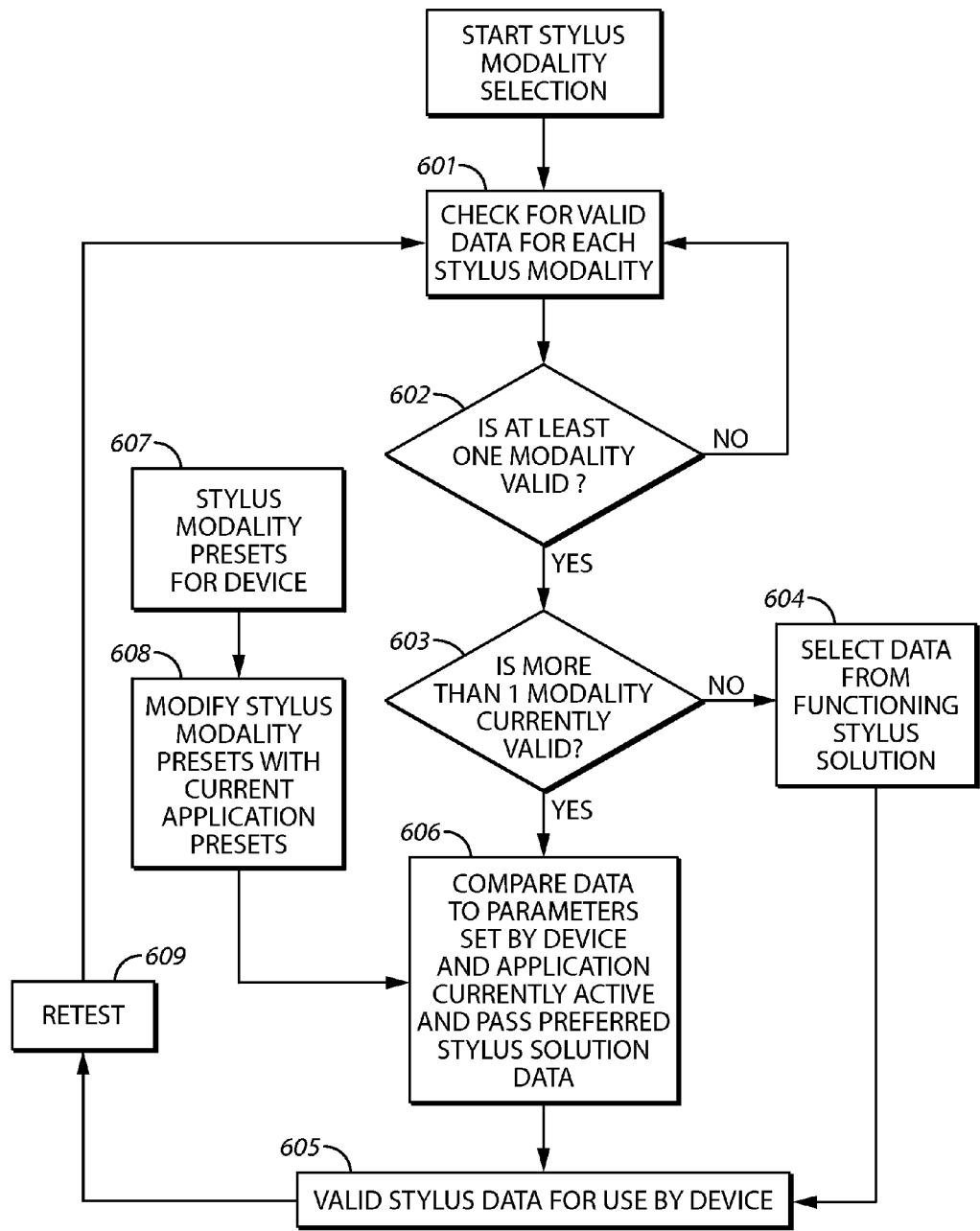
FIG. 6 is a flow diagram in accordance with the disclosure.

FIG. 6 presents a more specifically-detailed example in these regards. It will be understood that no particular limitations are intended by way of these specific details.

This process 600 presents an approach to selecting a particular location modality in a stylus. At 601 the control circuit 202 checks for valid data for each stylus location modality. At 602, in the absence of valid data that control circuit 202 continues to check for valid data. When at least one location modality provides valid data, at 603 the control circuit 202 determines whether more than one location modality is providing currently-valid data. When only one location modality provides valid data, at 604 the control circuit 202 selects that valid data and validates (at 605) that valid data for use by the corresponding device having the aforementioned scribing surface.

When more than one location modality provides valid data, at 606 the control circuit 202 compares the data to one or more relevant parameters of choice. By one approach, such a parameter can comprise a modality preset 607 as corresponds to the intended receiving device. Such a device-specific modality preset 607 can be known a priori to the control circuit 202 or can be requested, if desired, at a time of need.

By one approach, such a modality preset 607 can in turn be modified (at 608) as a function of a current application that is active at the intended receiving device. For example, such a current application can have specific corresponding location-information presets that can be used in lieu of any global presets that might otherwise apply. As a very specific example, a given application might have particularly high location-resolution requirements in order to assure an appropriate user experience and these higher requirements can be used when considering the data being provided by the plurality of location modalities.

Once selected at 606, the control circuit 202 validates that selected data at 605 and the process 600 can then repeat with a corresponding retesting (at 609) for valid data.

These teachings are highly flexible in practice and will readily accommodate a variety of modifications to the foregoing. As one example in these regards, such a stylus 100 can also include a passive locator 209 of choice to thereby support a passive location modality that may be appropriate for use with a given surface control circuit 103 (either alone or in combination with one or more of the available non-passive location modalities).

So configured, a stylus 100 capable of supporting more than one non-passive location modality can dynamically switch between the active use of any of a plurality of such non-passive location modalities as a function, at least in part, of the quality of the data being provided thereby. The measure of quality, in turn, can be dynamically influenced, if desired, by information regarding application-specific metrics in these regards. These capabilities, in turn, contribute to an improved user experience and more effective use of the surface 102 itself.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
a stylus configured for interactive use with a surface comprising:
a stylus housing;
a control circuit supported by the stylus housing and configured to:
selectively effect at least two different non-passive location modalities such that each of the non-passive location modalities imparts location-determination information; and
select, as a function, at least in part, of a comparison of data quality, whether to transmit the location-determination information from a first one of the at least two different non-passive location modalities or to transmit the location-determination information from a second, different one of the at least two non-passive location modalities.

2. The apparatus of claim 1 wherein the two different non-passive location modalities include at least one of:
a capacitively-based non-passive location modality;
an acoustically-based non-passive location modality;
a magnetically-based non-passive location modality;
a light-emitting-based non-passive location modality;
a radio-frequency-based non-passive location modality.

3. The apparatus of claim 1 wherein a first one of the at least two different non-passive location modalities is more effective when the stylus hovers over the surface as compared to when the stylus contacts the surface and a second one of the at least two different non-passive location modalities is more effective when the stylus contacts the surface as compared to when the stylus hovers over the surface.

4. The apparatus of claim 1 wherein the comparison of data quality comprises, at least in part, a comparison of metrics that indicate a presence or absence of valid data.

5. The apparatus of claim 1 wherein the control circuit is configured to automatically compare the data quality on a periodic basis.

6. The apparatus of claim 5 wherein the control circuit wherein the periodic basis is at least once every one hundred milliseconds.

7. The apparatus of claim 1 wherein the control circuit is configured to employ a data quality standard as corresponds, at least in part, to a currently-active application.

8. The apparatus of claim 7 wherein the currently-active application comprises an application that is currently active in an electronic device that comprises the surface.

9. A method comprising:
by a stylus control circuit as regards use of a stylus with a corresponding surface:
comparing data quality as corresponds to stylus location-determination information being provided by at least two different stylus-based candidate non-passive location modalities to thereby select a particular stylus-based non-passive location modality;
automatically using the particular stylus-based non-passive location modality when transmitting stylus location-determination information to an electronic device that comprises the corresponding surface.

10. The method of claim 9 wherein the control circuit is configured to automatically compare the data quality on a periodic basis.

11. The method of claim 9 wherein the control circuit wherein the periodic basis is at least once every one hundred milliseconds.

12. The method of claim 9 wherein comparing the data quality comprises, at least in part, a comparison of metrics that indicate a presence or absence of valid data.

13. The method of claim 9 wherein comparing the data quality comprises employing a data quality standard as corresponds, at least in part, to a currently-active application.

14. The method of claim 13 wherein the currently-active application comprises an application that is currently active in the electronic device that comprises the corresponding surface.

* * * * *